United States Patent

[11] 3,557,320

[72] Inventor Jurgen Hopf
Rodacher Strasse 62, Kronach, Germany

[21] Appl. No. 659,197
[22] Filed Aug. 8, 1967
[45] Patented Jan. 19, 1971

[54] REPRODUCTION OF A STILL PICTURE FROM A VIDEO TAPE RECORDING BY COMBINED DROP-OUT ZONE SENSING
12 Claims, 4 Drawing Figs.

[52] U.S. Cl. .......... 179/100.2, 178/6.6
[51] Int. Cl. .......... G11b 5/52, H04n 5/78
[50] Field of Search .......... 178/6.6A, FSS, D; 179/100.2T

[56] References Cited

UNITED STATES PATENTS 3,375,331 3/1968 Okazaki .......... 179/100.2
3,294,902 12/1966 Maxey .......... 178/6.6
3,157,739 11/1964 Okamura .......... 178/6.6

*Primary Examiner*—Bernard Konick
*Assistant Examiner*—Raymond F. Cardillo, Jr.
*Attorney*—Michael S. Striker

ABSTRACT: A tape containing a sequence of television picture signals recorded in parallel tracks at normal recording speed, is scanned while at slow motion speed. The tape is stopped when the crossover dropout zone is immediately followed or preceded by an additional dropout zone. The additional dropout zone results from simultaneous tracking of two neighboring tracks and the space between, due to the reduced tape advance speed. This criterion is evaluated by generating a pulse whose amplitude is proportional to the width of the combined dropout zone. When this pulse reaches a maximum amplitude, a switching circuit stops the tape transport. A timing circuit restarts the transport after an adjustable time interval.

Inventor:
Jurgen Hopf
by Michael S. Striker
Attorney

Inventor:
Jurgen Hopf
by Michael S. Striker
Attorney

REPRODUCTION OF A STILL PICTURE FROM A VIDEO TAPE RECORDING BY COMBINED DROP-OUT ZONE SENSING

BACKGROUND OF THE INVENTION

The invention relates to the reproduction of a still picture from a television picture sequence which is recorded on a magnetic tape in mutually parallel tracks containing the signals corresponding to one or more T.V. fields in a frequency modulated form, as recorded by one or more rotating magnetic heads.

For recording picture signals, and in particular television signals, magnetically, it is important to store a frequency range of approximately 10 Hz. to, for example, 2.5 MHz. on a magnetic tape. In order to achieve the required recording speed for this purpose, a well known single head method employs a videomagnetic head mounted in the circumference of a rotating disc. The magnetic tape then moves either in a helical advance or in Ω-form in an almost closed winding over the disc. In the above mentioned method the recording results in magnetic tracks which are at an angle to the edge of the tape and each of which contains, for example, a complete television field. The length of the magnetic tracks correspond to the circumference of the disc, or the circle described by the working slot of the videomagnetic head, increased or decreased by the length of magnetic tape transported in the time required for one rotation of the disc, depending on the direction of rotation of the disc. After each rotation the head briefly drops under the lower edge of the tape, only to start a new track parallel to the preceding track at the upper edge of the tape. This tape crossover, in which no signals are recorded, takes place in about 300 microseconds for a helical tape transport. The gap in the reproduced picture can not be been on the screen, since it falls into the flyback time of the picture signal.

Conventional picture recording and reproduction systems are not immediately suitable for the reproduction of a still picture from a recorded picture sequence, since the rotating magnetic head does not pass over the tape at the same angle with reference to the edge of the tape as when the tape transport is active. Since, furthermore, the distance between the magnetic tracks is very small in order to yield a high information density, (it is for example in the order of magnitude of 50 micron) the magnetic head will touch not only one track but also the neighboring track when the tape is stopped. However if two magnetic tracks are sensed simultaneously the two picture signals interfere and a fault in the picture results.

It is well known that fundamentally the reproduction of a single picture is only possible when the tape speed, the width of the tape, the width of the track and the head-disc diameter have a predetermined calculable relationship to each other. However, if a picture reproduction is then attempted at a much lower tape speed a fault in the reproduced picture may run for example from the top to the bottom. However, if the tape transport is stopped in a place in which the disturbance coincides with the flyback time of the television picture signal, then said disturbance will no longer be visible in the picture. Thus a perfect still picture reproduction is possible. Up to now the time for stopping the band transport could be determined by stopping the transport completely and then turning the clutch spindle to search for the correct placement. Alternatively, a slow-motion tape advance may be switched in and then switched off when simultaneous viewing of the picture indicates a suitable time.

SuMMARY OF THE INVENTION

It is the object of this invention to control the tape transport automatically in such a way that the still picture reproduction takes place without a fault in the picture. This is to be accomplished by stopping a moving tape transport or by switching in a stationary tape transport for a short time and then switching it off again. The automatic control is, for example, to be started by a switch and should be effective from both a stopped tape, a slow-motion advance, and the normal tape transport speed.

This invention is thus a system for reproducing a substantially fault free still picture from a sequence of pictures recorded, by means of rotating recording means, in mutually parallel tracks separated by intertrack spaces on a signal carrier means, while said signal carrier means is advanced past said recording means at normal recording speed. It comprises means for advancing said signal carrier means at a greatly reduced speed. It further comprises rotating scanning means sequentially scanning said parallel tracks while said signal carrier means is being advanced at said greatly reduced speed. Said rotating scanning means will thus generate a scanned signal having crossover dropout zones resulting from crossover of said scanning means from one track to the next track, and additional dropout zones resulting from simultaneous tracking of portions of two neighboring tracks and the included intertrack space. The width of the combined dropout zones resulting from the time sequence combination of said above mentioned dropout zones will vary in dependence of the relative position in time of said two types of dropout zones and will be a maximum when said two types of dropout zones follow each other directly in time. The system according to this invention further comprises signal generating means for generating a stop signal when said combined dropout zone is a maximum.

If the stopping of the tape transport is accomplished in this manner, the videomagnetic head receives the full frequency modulated signal only somewhat after the crossover time. Therefore a still picture will have the dropout zone only in the flyback time which exists in any case and therefore results in as fault free a still picture as possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
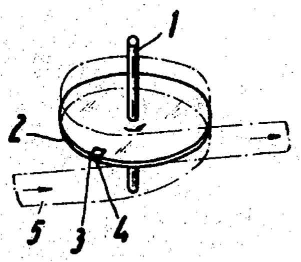
FIG. 1 is a fundamental representation of an arrangement comprising a rotating disc carrying a recording or scanning head, and a tape which advances helically around said head.
Figure 2:
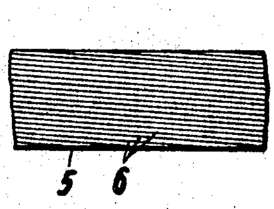
FIG. 2 is a section of magnetic tape with transverse recording tracks.

DESCRIPTION OF THE PREFERRED EMBODIMENTS in FIG. 1 reference numeral 1 designates a rotatably mounted shaft on which is mounted a circular disc 2. A magnetic recording and scanning head 3 having a working slot 4 is inserted in the circumference of the disc. A magnetic tape 5 is advanced by conventional advancement means from a supply reel in a helical winding around the disc 2 and from there to a takeup reel. Depending on the velocities of the magnetic head and of the tape a magnetic track 6 (FIG. 2) is recorded for each rotation of the magnetic head. This magnetic track will be at an angle to the edge of the tape. It may contain, for example, the signals for a complete television field in frequency modulated form. The mutually parallel magnetic tracks 7 to 11 (FIG. 3) form an angle $\beta$ with the lower edge of the tape.

Figure 3:
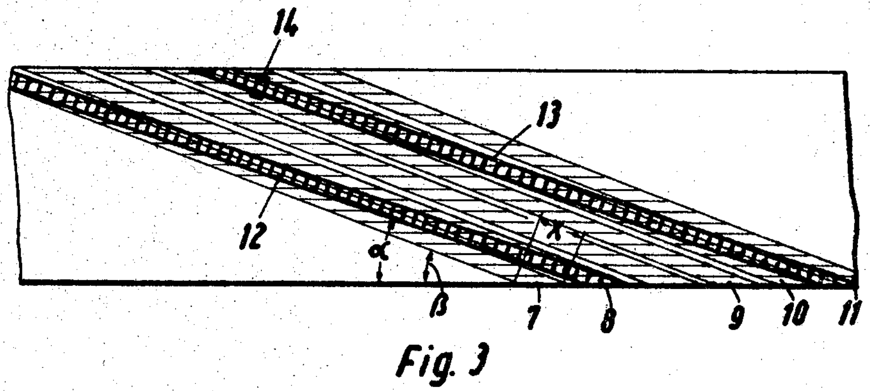
FIG. 3 is a section of magnetic tape with recorded magnetic tracks and with tracks described by said head when the tape advance is stopped.

If, in order to reproduce a still picture, that is to reproduce the signal in a single magnetic track, the magnetic tape is scanned while at standstill without use of a special arrangement for still picture reproduction, then the magnetic head may for example scan a track 12 (track corresponding to zero tape advance), whose angle to the edge of the tape is designated $\alpha$ and which is smaller than the angle $\beta$ because the tape advance has been stopped. As shown in FIG. 3 when the magnetic head follows the standstill track 12 it will, starting with the upper edge of the tape, first scan track 7 in its full width. After approximately a third of the tape width has passed, the magnetic head will scan track 7 and its neighboring track 8, thus causing disturbances in the reproduced picture. This condition lasts until, in the last third, only the neighboring track 8 is scanned. In this fashion it is impossible to obtain a disturbance-free still picture.

FIG. 3 contains a further standstill track 13, which corresponds to the position in which it is possible to have still picture reproduction without disturbances. The standstill track 13 begins at the upper edge of the tape and first touches both neighboring tracks 9 and 10. In the middle region the magnetic head 14 scans solely track 10, while in the region of the lower tape edge both tracks 10 and 11 are scanned simultaneously. This type of scanning thus results in a still picture which has faulty areas only in the region of the tape edges, that is in the regions corresponding to the flyback time of the picture signal. That is, an apparent lengthening of the dropout zone resulting from the track crossover occurs which will result in either no, or only minimal, fault in the reproduced picture.

Figure 4:
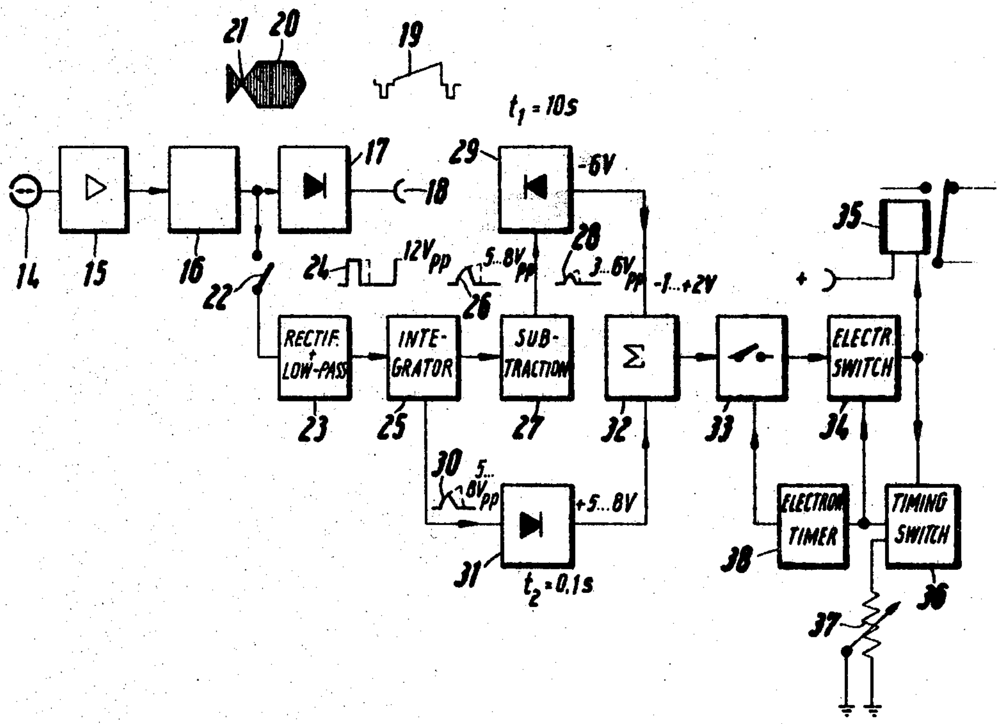
FIG. 4 is a block diagram for the circuitry required for reproducing the still picture.

The means to achieve the position of the standstill track 13 as shown in FIG. 3 comprise an arrangement illustrated in block diagram form in FIG. 4. The rotating scanning means, namely, the magnetic scanning head, is indicated at reference numeral 14. The signal generating means for generating a stop signal to stop the tape advance comprise the stages labeled 23 and 25, which will be further described below. Switching means responsive to the stop signal and adapted to stop the advance of the tape comprise stage 34 and 35. The means for compensating for differences in the crossover dropout zones for different recording and scanning systems and tapes comprise the stages labels 31, 27, 29 and 32. These and other features of the system will now be described in detail. The signals scanned by the magnetic scanning head 14, namely, a scanned FM picture signal is fed to the input of a preamplifier 15, whose output is connected to a demodulator 17 by means of a limiter 16. At the output 18 of the demodulator a television signal is available for reproduction in a monitor or in a commercial television apparatus.

The FM signal 20 which has been limited in stage 16, contains a dropout zone 21 which results from a track crossover in the sequential scanning of two magnetic tracks. In order to start the system for the evaluation of the dropout zone of the FM signal 20, a switch 22 is depressed so that the FM signal is rectified in stage 23. The dropout zones are filtered out of the rectified signal by means of a low pass filter which also is contained in stage 23. These are fed as pulses to a switching stage, for example a switching transistor, thus converting the pulse into a steep pulse 24 of approximately 12 volts peak to peak. The width of the pulse 24 will vary according to the duration of the dropout zone.

In a subsequent integrating stage 25, having a time constant which is larger than the largest possible pulse width or dropout zone, an integrated pulse 26 is generated having an amplitude smaller than 12 volts peak to peak, for example 5 to 8 volts peak to peak. In this fashion, changes in pulse width are converted to changes in pulse amplitude, according to an e function. (See the pulse width and pulse amplitude indicated by the dashed line.) The pulse 26 which has been thus generated is fed to two different stages. It is fed to a subtraction stage 27 whose function will be further described below and in which the pulse amplitude is decreased by a fixed amount, for example 2 volts. (See pulse 28.) A negative peak rectifier stage 29 then generates a negative DC value, for example −6 volts in dependence on the pulse 28. This negative direct voltage is discharged over a time constant member having a constant $t_1$=10 seconds.

A pulse 30, of, for example, 5 to 8 volts peak to peak, generated in integrator stage 25, is fed to a positive peak rectifier 31 which generates a positive direct voltage of  to 8 volts, which discharges over a time constant member having a time constant of $t_2$=0.1 seconds.

Since the width of the pulses 28 and 30 is appreciably smaller than the above mentioned time constants $t_1$ and $t_2$, the output voltages of the peak rectifier stage 29 and 31, and thus the output voltage of an adder stage 32 connected to said stages 29 and 31, remains constant. If for example the output voltage of the intergrator stage 25 consists of 8 volts peak to peak at a particular time period $t_0$, then the negative direct voltage at the output of stage 29 has a value of 8V−2V=6V and a positive direct current voltage at the output of stage 31 (which does not have a subtraction stage preceding it) has a value of 8 V. Addition of the two voltage values in the adder stage 32 then results in the sum −6V+8V=+2V.

If for any reason the amplitude of the integrated pulse 26 changes from $\pm 8V_pp$ to, for example, $+5V_pp$, then the output voltage of stage 29 if previously sufficiently discharged will be−3V, the output voltage of stage 31 will be +5V and the sum generated in the adder stage will again be +5V−3V=+2V. Therefore quiescent differences in the output voltage amplitude of stage 25 which is a measure for the length of the dropout zone are automatically compensated for. In this way differences in track crossover time resulting from differences in the reproduction equipment or from differences in the quality of the tape become ineffective.

Thus it is shown that the stages 31, 27, 29 and 32 serve effectively to compensate for differences in different playback setups. It should be remembered for the discussion below that the negative voltage at the output of stage 29 will remain substantially constant in any one setup because of the large time constant of the circuit. Its value will be such that the adder circuit 32 will furnish an output of the maximum voltage only when the positive peak rectifier 31 furnishes a voltage corresponding to the peak possible pulse amplitude of pulse 30 corresponding to the particular setup.

The criterion for stopping the tape advance is now obtained in the following fashion. It must be kept in mind that, as stated above, for any one particular setup the stage 29 furnishes a substantially constant negative voltage corresponding to the peak amplitude of pulse 26 or 30, which in turn corresponds to the maximum combined dropout zone possible for a given setup. With this in mind, the tape advance velocity may be so chosen that, for example, one complete magnetic track, corresponding to one frame of the television signal is advanced past the rotating magnetic head per second. A dropout zone due to track crossover appears for each rotation of the magnetic head. For example the magnetic head may be rotating at such a speed that a dropout zone occurs every 20 milliseconds. During any one second time interval the relative position of the tape as referred to the rotating magnetic head will thus change from, for example, the condition corresponding to track 12 in FIG. 3 to the condition corresponding to track 13 in FIG. 3 and back again to the condition corresponding to track 12. During the time that the relative positions of the tape and the magnetic head are such that the conditions corresponding to track 12 prevail, a dropout zone exists in the FM signal which corresponds to the track crossover time. This condition leads to an integrated pulse 26 which does not have the maximum possible amplitude and therefore the output of the adder stage 32 will not have an amplitude sufficient to energize the electronic switch. If however the relative position of the tape and the rotating magnetic head is such as indicated in track 13 of FIG. 3, the two neighboring tracks will be scanned immediately following the track crossover. This will result in an FM signal having an apparently increased dropout zone, which will be limited, rectified and filtered and integrated and will thus result in peak pulses 30 and 26. The peak pulse 30 will be rectified by positive peak rectifier 31 and will result in an adder output which is sufficient to energize the electronic switching arrangement. In between the conditions corresponding to tracks 12 and 13 intermediate values of dropout zones may be obtained, but the maximum dropout zone is obtained only for the condition corresponding to that indicated as track 13. The output of the adder stage 32 will thus be a varying signal having a maximum value when the conditions corresponding to track 13 exist and a minimum value for conditions corresponding to track 12. Only that value of the signal corresponding to the conditions of track 13 is effective as a stop signal because the threshold voltage of the switching trigger circuit is set to correspond to this value.

The switching circuit will now be described in detail. The switching means which serve to stop the tape advance in response to the stop signal from the adding stage 32 comprise an electronic switch 34 (Schmitt trigger) which opens when its threshold voltage, in this example 2.0 V, is reached and energizes a relay 35. This relay stops the tape advance. In order to limit the stoppage of the tape to a predetermined time period so that one particular standstill track is not sensed continually and thus subjected to excessive wear, a timing switch 36 is connected to the output of the trigger 34. This timing switch includes an adjustable resistance 37 with which it is possible to adjust the duration of the still picture from, for example, 1 second to 2 minutes continuously. After the expiration of the selected still picture duration the relay 35 is deenergized and the tape transfer recommences. A further electronic timing switch 38 which is controlled by a contact of the relay 35 serves to interrupt the connection between the adder stage 32 and the trigger 34 by means of an additional electronic switch 33, and thus prevents a renewed activation of the relay at the same position of the tape. Only after a predetermined time delay, for example 0.3 seconds, is this connection reestablished. The tape is then advanced until such time as the amplitude of +2V again appears at the output of adder stage 32, that is, during the scanning of the next magnetic track. Then the tape advance is again turned off. By increasing the time delay of the time delay switch 38 several tracks may be skipped if desired.

Because of the compensation arrangement described above it is possible to arrange the Schmitt trigger 34 in such a way that it has a fixed threshold voltage at, for example, the voltage of +2V. If now the pulses are suddenly missing, as, for example, because the recording on the tape has ended or because the videohead is blocked by dirt, the maximum output voltage of the adder stage cannot exist. The positive peak rectifier discharges rapidly and the output of the adder stage passes through negative values and then to the 0 value at the discharge of the negative peak rectifier circuit. Thus trigger 34 and the relay 35 cannot be activated. Thus the tape transfer 4 continues uninterrupted until such time as a new FM signal is delivered by the magnetic head and the peak pulse output can again exist. This also prevents destruction of the tape.

By reversing the tape transport a reverse slow-motion reproduction may take place and therefore it is possible to reproduce a still picture under conditions of reversed tape transport.

While the in invention has been described and illustrated as embodied in a particular circuit embodiment for using the maximum combined dropout zone as a criterion to stop the tape advance, it is not intended to be limited to the details shown, since various modifications and circuit changes may be made without departing in any way from the spirit of the present invention.

Without further analysis, the foregoing will so fully reveal the gist of the present invention others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. A system for reproducing a still picture from a sequence of pictures recorded, by means of rotating recording means, on a signal carrier means having mutually parallel tracks and intertrack spaces between said tracks, while said signal carrier means was advanced past said recording means at normal recording speed, comprising, in combination, means for advancing said signal carrier means at a predetermined speed, greatly reduced relative to said recording speed; rotating scanning means sequentially scanning said parallel tracks while said signal carrier means is being advanced at said greatly reduced speed, thus generating a scanned signal having a crossover dropout zone resulting from crossover from one track to the subsequent track, and additional dropout zones resulting from simultaneous tracking of portions of two neighboring tracks and the corresponding intertrack space; width measuring means operatively associated with said scanning means for furnishing a width signal having a width signal characteristic corresponding to the width of said dropout zones; signal generating means for generating a stop signal when said width signal characteristic exceeds a determined value, thus indicating the presence of a combined dropout zone resulting from the immediate sequence in time of one of said crossover dropout zones and one of said additional dropout zones; and switching means responsive to said stop signal and adapted to stop the advance of said signal storage means upon receipt of said stop signal.

2. A invention as set forth in claim 1, wherein said signal carrier means comprise a magnetic tape and said rotating scanning means comprise a magnetic head.

3. A system as set forth in claim 1, wherein said switching means comprise a trigger circuit having a predetermined threshold value equal to the amplitude of said stop signal; and a relay adapted to stop said tap advance upon energization of said relay; and wherein said trigger circuit is adapted to energize said relay when said stop signal is received.

4. A system as set forth in claim 1, also comprising means for restarting said tape transport after a predetermined still picture time period in order to avoid excessive wear of the scanned track.

5. A system as set forth in claim 1, wherein said signal generating means comprise means for generating a pulse having an amplitude proportional to the width of said combined dropout zone and wherein said stop signal comprises said pulse at its maximum amplitude.

6. A system as set forth in claim 5, wherein said means for generating a signal having an amplitude proportional to the width of said combined dropout zone comprise means for generating a pulse having a width proportional to the width of said dropout zone; and means for integrating said pulse, thus generating said signal having an amplitude proportional to the width of said combined dropout zone.

7. A system as set forth in claim 6, wherein said means for generating a pulse having a width proportional to the width of said combined dropout zone comprises a limiter stage; and a rectifier and low pass filter stage also including a switching transistor, adapted to generate a pulse having a steep rise and fall.

8. A system as set forth in claim 5, also comprising means for compensating for differences in the width of crossover dropout zones for different equipment.

9. A system as set forth in claim 8, wherein said compensating means comprise subtraction means adapted to subtract predetermined fixed subtraction value from said pulse thus generating a decreased amplitude pulse; negative peak rectifier means adapted to generate a negative direct current signal proportional to the amplitude of said decreased amplitude pulse; positive peak rectifier means adapted to generate a positive direct current signal proportional to the amplitude of said pulse, wherein the discharge time constant of said positive peak rectifier means is larger than the interval between said pulses, but substantially smaller than the discharge time constant of said negative peak rectifier means; and an adder circuit for adding said negative direct current signal and said positive direct current signal and generating an adder output signal, said adder output attaining its maximum value corresponding to the value of said stop signal only when said pulse has an amplitude corresponding to the maximum width of the combined dropout zone.

10. A system as set forth in claim 9, wherein said positive peak rectifier discharge time constant is approximately equal to .1 seconds and said negative peak rectifier time constant is approximately equal to 10 seconds.

11. A system as set forth in claim 10, wherein said restarting means comprise an electronic timing switch having a selectable delay time and adapted to generate a tape transport restart signal at the end of said delay time.

12. A system as set forth in claim 10, also comprising additional time delay means responsive to said tape transport restart signal and adapted to generate a disconnect signal for a predetermined disconnect time delay following said tape transport restart signal; and means for disconnecting said adder means from said switching means for the duration of said disconnect signal, thus preventing the tape transport from restopping at the same location as for the previous still picture.

UNITED STATES PATENT OFFICE

CERTIFICATE OF CORRECTION

Patent No. 3,557,320 Dated January 19, 1971

Inventor(s) Jurgen Hopf

It is certified that error appears in the above-identified patent and that said Letters Patent are hereby corrected as shown below:

On the cover sheet insert -- [73] Assignee Loewe Opta GmbH, Berlin, Germany --.

Signed and sealed this 30th day of November 1971.

(SEAL)
Attest:

EDWARD M.FLETCHER,JR.
Attesting Officer

ROBERT GOTTSCHALK
Acting Commissioner of Pate

FORM PO-1050 (10-69)